United States Patent [19]

Owen et al.

[11] Patent Number: 5,143,204
[45] Date of Patent: Sep. 1, 1992

[54] CONVEYOR CHAIN GUIDE RAIL SYSTEM

[75] Inventors: Barry C. Owen, Southfield; Timothy H. Drury, Howell, both of Mich.

[73] Assignee: Elopak Systems A.G., Glattbrugg, Switzerland

[21] Appl. No.: 812,411

[22] Filed: Dec. 23, 1991

[51] Int. Cl.⁵ ............................................. B65G 19/00
[52] U.S. Cl. ......................................... 198/726; 198/841
[58] Field of Search ............... 198/626.1, 626.5, 726, 198/841

[56] References Cited

U.S. PATENT DOCUMENTS

| | | | |
|---|---|---|---|
| 2,368,483 | 11/1945 | Monroe | 198/726 |
| 3,454,142 | 7/1969 | Holstein | 198/726 |
| 3,550,754 | 12/1970 | Ganz | 198/726 |
| 4,159,056 | 6/1979 | Pirman et al. | 198/726 |
| 4,198,901 | 4/1980 | Kundsen | 198/726 |
| 4,545,477 | 10/1985 | Besch | 198/841 |

Primary Examiner—Joseph E. Valenza
Attorney, Agent, or Firm—John P. Moran

[57] ABSTRACT

A conveyor chain guide rail system for a conveyor chain having compartments formed therein for carrying square or rectangular cross-section cartons to be filled with still liquid products. The chain guide rail system includes a polymer Z-shaped elongated segment wherein one leg thereof serves as a wear surface supporting the chain and the associated lugs forming the compartments, and the other leg thereof is slidably confined between stainless steel strips, one of which is supported by support posts on the machine base. The resultant arrangement precludes longitudinal deformation or buckling of the polymer segments.

10 Claims, 4 Drawing Sheets

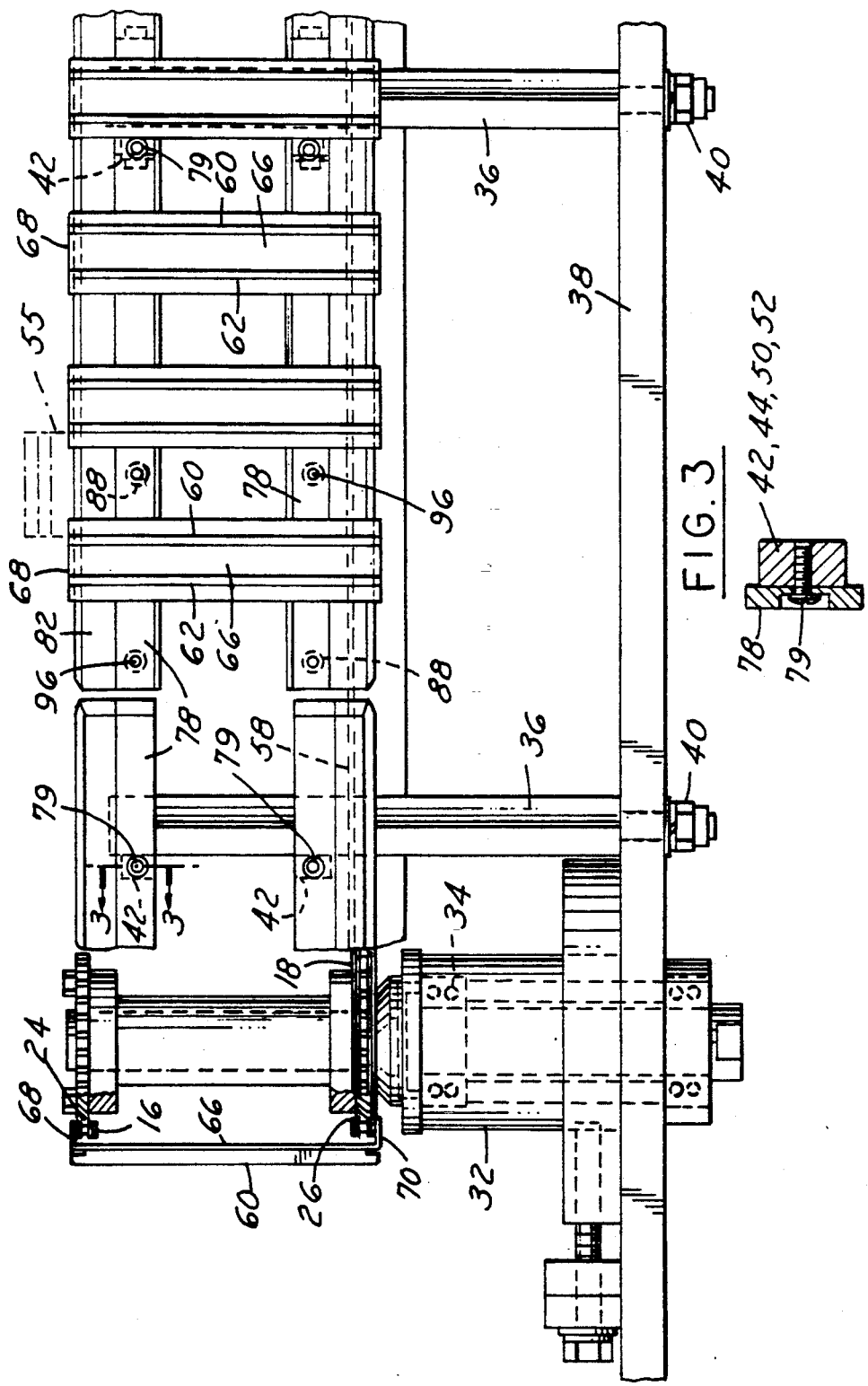

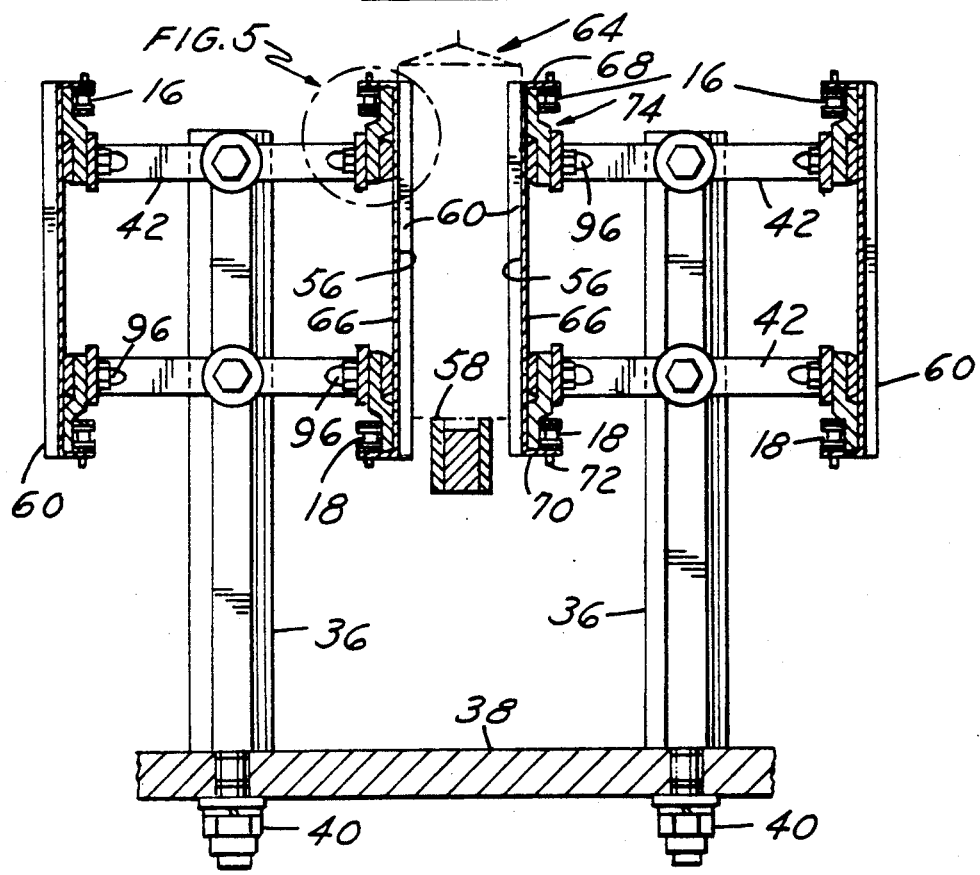
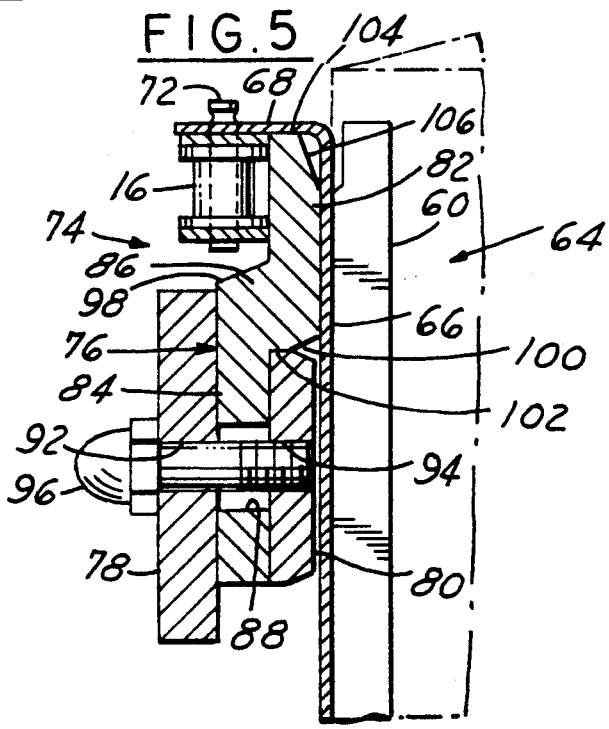

CONVEYOR CHAIN GUIDE RAIL SYSTEM

TECHNICAL FIELD

This invention relates generally to indexing conveyor mechanisms having compartments therein for carrying cartons to be filled by a still liquid product and, more particularly, to a chain guide rail system for same.

BACKGROUND ART

Heretofore, conveyor chain guide rail systems have had a tendency to become deformed or assume a somewhat "S" shaped configuration throughout their lengths, or in order for such conveyor chain guide rail systems to remain straight without any deformation or buckling throughout the length thereof, it was necessary to provide thick and, hence, heavy and more costly components therefor. More specifically, prior chain guide rail systems have consisted of parallel, interconnected plastic and metal longitudinal strips, with the plastic strip supporting a moving chain and lug system, and the steel strip mounted via support posts to a machine base, wherein one or both strips have been made sufficiently thick to resist deformation of the interconnected strips throughout their length.

DISCLOSURE OF THE INVENTION

A general object of the invention is to provide an improved conveyor chain guide rail system for food product packaging machinery.

Another object of the invention is to provide an improved conveyor chain guide rail system, including a polymer wear segment for supporting an indexing conveyor chain and lug system, and an associated pair of stainless steel strips supported on a packaging machine base, wherein the combination precludes deformation throughout the length thereof.

A further object to the invention is to provide a conveyor chain guide rail system, including a polymer segment and a pair of stainless steel strips having provisions for preventing deformation throughout the length thereof, while accommodating thermal linear expansion of the polymer segment.

Still another object of the invention is to provide a conveyor chain guide rail system, including a polymer segment and a pair of stainless steel strips, wherein the polymer segment is substantially "Z" shaped in cross-section, with one leg of the segment having a wear surface formed on the distal end thereof to support the conveyor chain and lug system, and the second leg of the segment being supported on and confined between the pair of stainless steel strips.

These and other objects and advantages will become more apparent when reference is made to the following drawings and the associated description.

BRIEF DESCRIPTION OF THE DRAWINGS

FIG. 2A is a fragmentary side elevational view taken along the plane of the line 2A—2A of FIG. 1A, and looking in the direction of the arrows;

FIG. 3 is a cross-sectional view taken along the plane of the line 3—3 of FIG. 2A, and looking in the direction of the arrows;

FIG. 4 is an end view taken along the plane of line 4—4 of FIG. 1A, and looking in the direction of the arrows; and FIG. 5 is an enlarged view of a portion of the FIG. 4 structure.

BEST MODE OF CARRYING OUT THE INVENTION

Figure 1A:
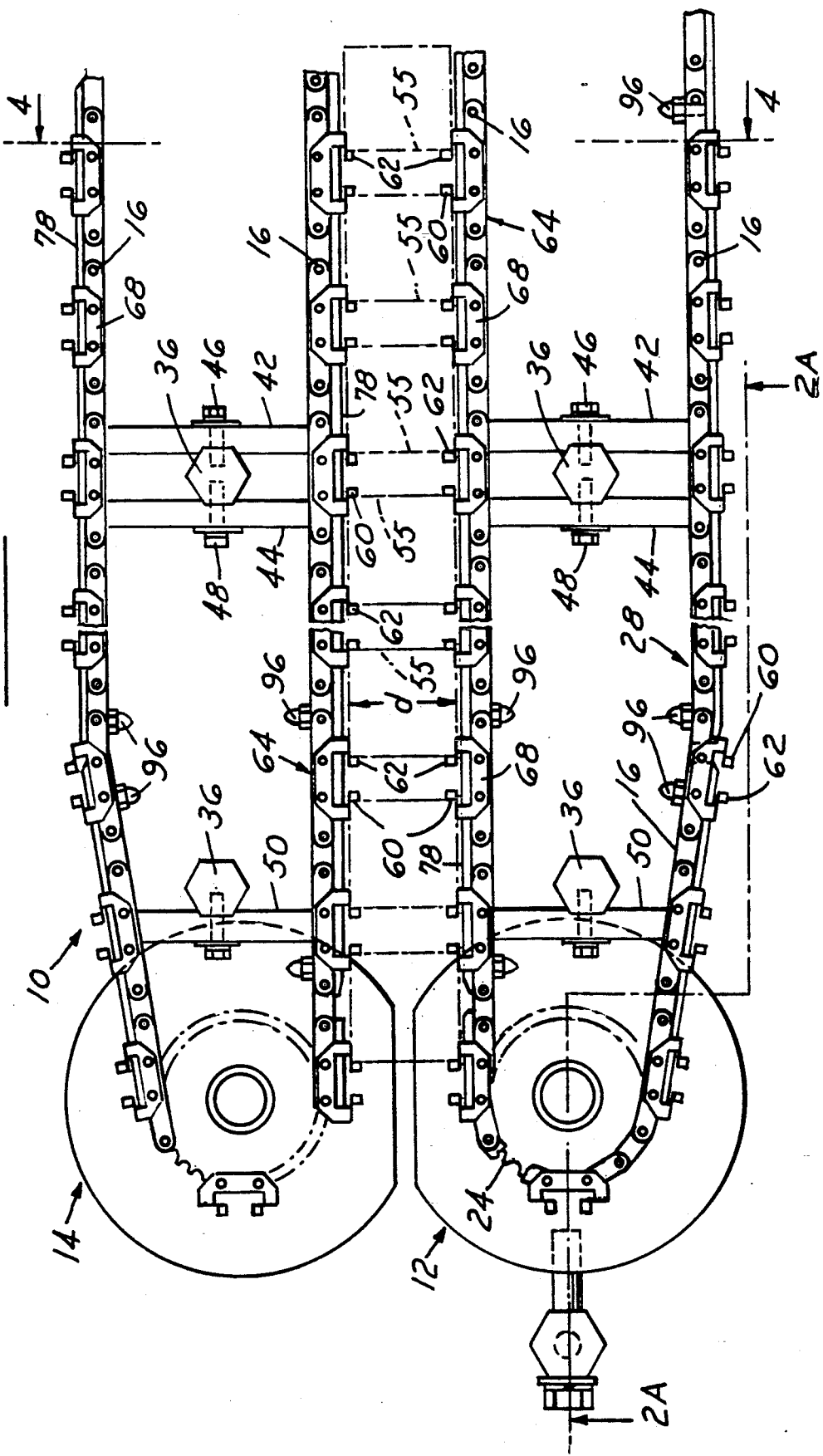
FIGS. 1A and 1B are partial plan views of a conveyor system embodying the invention.

Referring now to the drawings in greater detail, FIGS. 1-4 illustrate a conveyor chain guide rail system 10. The system 10 includes two identical, but opposite hand, chain assemblies 12 and 14 (FIGS. 1 and 2). For the sake of clarity, the assembly 12 on one side of the system 10 will be explained, the assembly 14 having comparable components.

The assembly 12 includes upper and lower endless chains 16 and 18 (FIG. 2A), mounted around an upper and lower driven pair of sprockets 20 and 22 at one location (FIG. 1B), and an upper and lower idler pair of sprockets 24 and 26 at the second location (FIGS. 1A and 2A), causing the chains 16 and 18 to form two-tiers of closed loops 28.

The pair of upper and lower sprockets 20 and 22 are driven by a gear set 29 operatively connected to an indexer mechanism, represented as 30 (FIG. 2B), while the pair of sprockets 24 and 26 are mounted on idler support structures 32 having suitable bearings 34.

A plurality of horizontally spaced support columns 36 secured to the machine base 38 by suitable fasteners 40 serve to support the chain assembly 12 in a manner to be described. A pair of vertically spaced equal length cross bars 42 and 44 are secured by suitable fasteners 46 and 48, respectively, to each of the fore and aft sides (FIGS. 1A and 1B) of each support column 36, except for the support columns immediately adjacent the oppositely disposed indexer mechanism 30 and the support structure 32.

In the latter case, vertically spaced cross bars 50 (FIG. 1A) and 52 (FIG. 1B) are secured to only one side of the support column 36, and extend a shorter distance to the outboard side thereof. The length to the inboard side thereof is the same as for the cross bars 42 and 44. This arrangement provides a straight line for the upper and lower chains 16 and 18 on the inboard side, and angled lines therefor on the outboard side as the chains leave the indexer mechanism 30 and as they approach the support structure 32. If desired, the outboard side may be straight from the indexer mechanism 30 to the support structure 32.

Figure 1B:
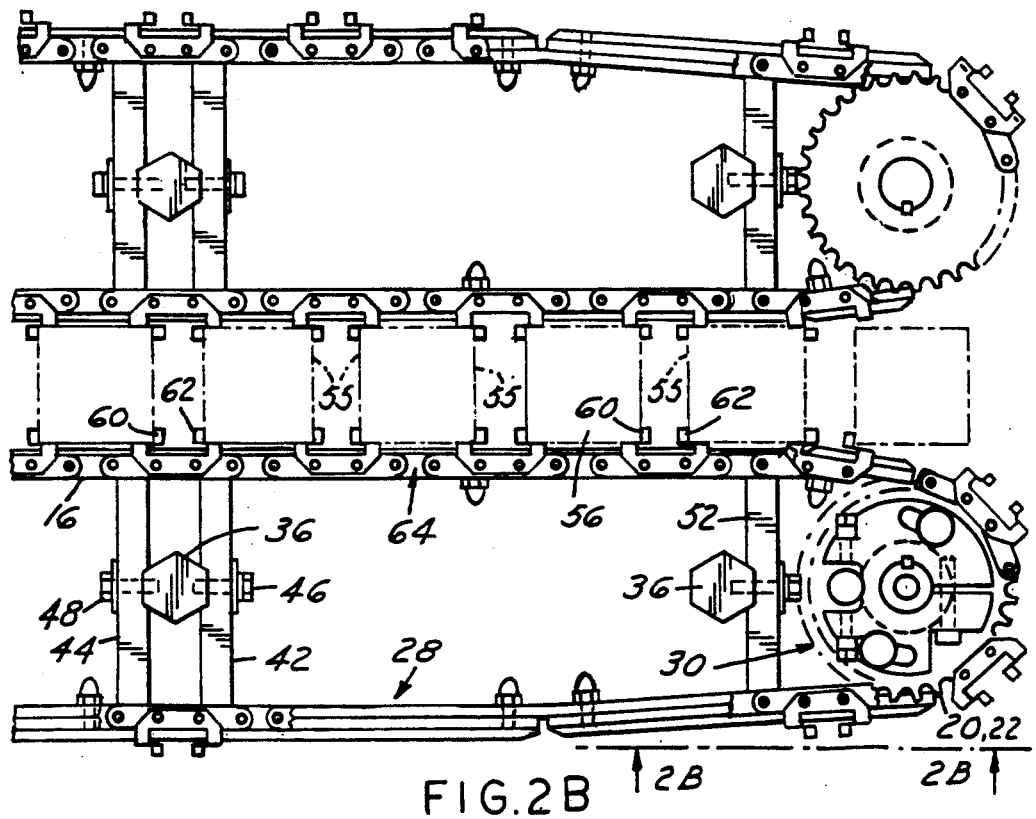
Figure 2B:
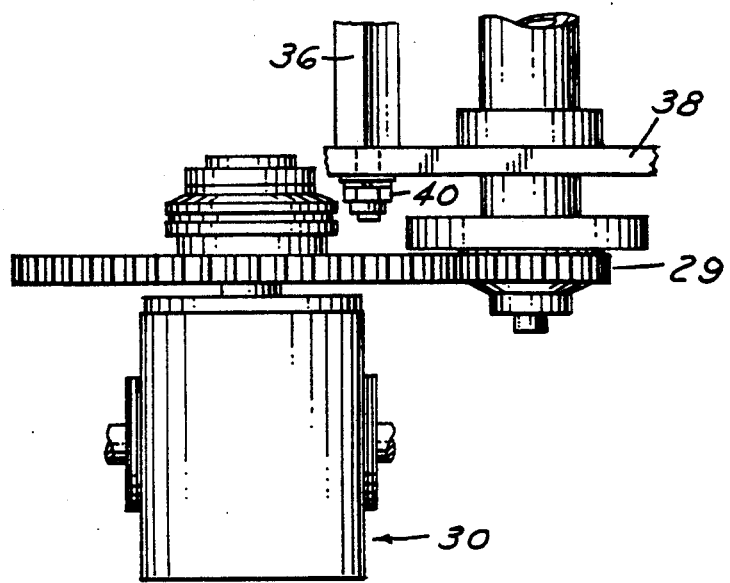
FIG. 2B is a side view taken along the plane of the line 2B—2B of FIG. 1B, and looking in the direction of the arrows.

As may be noted on FIGS. 1A and 1B, each of the above described elements is duplicated at a predetermined distance "d" from the inboard side in an opposite hand configuration, and will hereinafter be identified by the same reference numerals bearing primes. The distance "d" is such that it defines a space 54 that accommodates the width of a selected size of either square or rectangular cross-section containers 55 adapted to being filled with a still liquid product prior to sealing the top closure thereof.

As shown in FIGS. 1 and 3, the containers 55 are carried in individual compartments 56 (FIG. 1) operatively connected to the upper and lower chains 16 and 18, and supported therein on individual support members 58 (FIG. 4). More specifically, each compartment 56 is formed by front and rear, square or rectangular cross-section, vertical bars 60 and 62, respectively, located on each side of the space provided by the distance d. It may be noted in FIG. 1 that, on each side of the space 54, a rear bar 62 and a front bar 60 are part of a lug assembly 64 operatively connected to the upper and lower chains 16 and 18.

The lug assembly 64 further includes a vertical plate 66 (FIG. 5) abutting against the pair of rear and front bars 62 and 60. A bent extension 68 is formed at the upper end of the plate 66, and a like bent extension 70 (FIG. 4) is formed at the lower end of the plate, extending respectively across the top surface of the upper chain 16 and across the bottom surface of the lower chain 18. The bent extensions 68 and 70 are secured to the respective chains 16 and 18 by suitable fasteners 72.

An assembly 74, including a segment 76 formed of a suitable polymer, preferably an ultra high molecular weight type polymer, commonly known as UHMW polymer, and a pair of steel strips 78 and 80, is operatively connected to the vertical plate 66 and each chain 16 and 18 in a manner and for a purpose which will now be described. The segments 76 and the strips 78 and 80 are formed in predetermined lengths, supported at spaced intervals by the cross bars 42, 44, 50 and 52.

The segment 76 is molded or machined to form substantially a "z" shaped cross-section (FIGS. 4 and 5) of a predetermined length. A first leg 82 extends so as to be confined between the plate 66 and the adjacent chain 16 or 18, and abutted against the bent extension 68 for the upper chain 16, and against the bent extension 70 for the lower chain 18. The other or second leg 84 is connected to the first leg 82 by a short center section 86, and extends intermediate the two steel strips 78 and 80. Elongated openings 88 are formed through the second leg 84. One opening (not shown) in the length of the second leg 84 may be sized to serve as a locator, while the remaining openings 88 are elongated for a purpose to be described.

Each steel strip 78 is secured to the ends of the various cross bars 42, 44, 50 and 52 by suitable fasteners 79, as shown in FIG. 3. As shown in FIG. 5, an opening 92 is formed through the strip 78. The strip 80 is located between the vertical plate 66 and the second leg 84 of the segment 76, and abutted against the center section 86. A threaded opening 94 is formed in the strip 80.

The elongated opening 88 through the leg 84 is formed to be longer than the diameters of the openings 92 and 94. A threaded fastener 96 is extended through the openings 92 and 88, and threadedly connected in the threaded opening 94 to secure the strips 78 and 80 and the segment 76 together, with the segment 76 being slidably confined between the strips 78 and 80, and thermal expansion thereof being possible by virtue of the elongated opening 88.

A first surface 98 forms one side of the center section 86 of the segment 76 and is tapered downwardly (FIG. 5) from the first leg 82 to the second leg 84. A second tapered surface 100, substantially parallel to the surface 98, forms an outer portion of the other side of the center section 86, and a horizontal surface 102 completes such other side. A horizontal surface 104 forms the distal end of the first leg 82, and a chamfer 106 may be formed on the edge adjacent the surface 104 to clear the radius corner between the plate 66 and the bent extension 68 and 70.

The horizontal surface 104 serves as a wear surface for supporting the upper chain 16, the bent extension 68, the vertical plate 66, and the front and rear vertical bars 60 and 62. The horizontal surface 102 serves as a shoulder to support the segment 76 on the plate 80.

Referring once again to FIG. 3 and 4, the following features may be noted.
1. The shape of the segment 76 provides rigidity;
2. The horizontal surface 102 provides vertical support for the segment 76 on the strip 80 which, in turn, is supported via the fasteners 96 on the strip 78;
3. The tapered surfaces 98 and 100 facilitate flushing of any contaminants from the segment 76;
4. The horizontal surface 104 is a wear surface against the bent extensions 68 and 70 for supporting the indexing chain 16, the vertical plate 66, and the rear and front bars 62 and 60 forming the lug system;
5. The elongated opening 88 serves to accommodate thermal linear expansion of the polymer segment 76 between the stainless steel strips 78 and 80;
6. Together, the assembly of the Z-shaped segment 76 slidably mounted intermediate the strips 78 and 80 precludes deformation or buckling of the segment 76; and
7. The assembly of the segment 76 and the strips 78 and 80 provide an efficient mounting via the strip 78 to the cross bars 42, 44, 50 and 52 and, thence, through the support columns 36 to the machine base 38.

In operation, the chains 16 and 18, the bent extensions 68 and 70 and their associated vertical plate 66, and the front and rear corner bars 60 and 62 are indexed as a unit by the indexing mechanism 30, around the various driven sprockets 20 and 22 and idler sprockets 24 and 26, supported and guided by the assembly consisting of the polymer segment 76 intermediate the stainless steel strips 78 and 80.

INDUSTRIAL APPLICABILITY

It should be apparent that the invention provides an improved, efficient, rigid, easily cleanable, and non-deformable conveyor chain guide rail system, with provisions for accommodating thermal expansion of a key component thereof.

It should be further apparent that the invention can be used on conveyor systems adapted for carrying various sizes of containers or cartons.

While but one embodiment of the invention has been shown and described, other modifications thereof are possible within the scope of the following claims.

What is claimed is:

1. For use with a packaging machine base and a conveyor having a pair of spaced endless chains and a plurality of carton conveying compartments cooperatively mounted therebetween, a chain guide rail system comprising a substantially Z shaped polymer segment including first and second legs and an interconnecting center section, a pair of stainless steel strips operatively connected to said base, wherein said first leg of said polymer segment supports the endless chain and compartment components and said second leg thereof is confined between said stainless steel strips.

2. The chain guide rail system described in claim 1, wherein said second leg is slidably confined between said stainless steel strips to permit thermal linear expansion therebetween.

3. The chain guide rail system described in claim 1, wherein a first horizontal surface is formed on the distal end of said first leg to support said chain and compartment components, and a second horizontal surface is formed on said center section for supporting said Z shaped polymer segment on one of said stainless steel strips.

4. The chain guide rail system described in claim 3, and aligned openings formed through said stainless steel strips and said second leg of said polymer segment, with the opening in one stainless steel strip being threaded, and a fastener mounted through said aligned openings and threadedly secured in the threaded opening.

5. The chain guide rail system described in claim 4, wherein said opening through said second leg of said polymer segment is larger than the openings through said stainless steel strips to accommodate thermal linear expansion of said second leg between said stainless steel strips.

6. The chain guide rail system described in claim 1, and tapered surfaces formed on said center section to facilitate flushing of any contaminants from the polymer segment.

7. The chain guide rail system described in claim 1, and spaced support posts mounted on said machine base, cross bars secured to the upper end of said support posts, wherein one of said stainless steel strips is secured to the ends of said cross bars.

8. The chain guide rail system described in claim 1, wherein said compartments each include a vertical plate, a bent horizontal extension formed on the upper end thereof and secured to one of said pair of endless chains, and spaced vertical bars secured to said vertical plate to serve as one front and one rear corner of each compartment, and wherein said bent extension rides on said first leg of said polymer segment.

9. The chain guide rail system described in claim 8, wherein a vertical plate and a bent horizontal extension are formed on the second of said pair of endless chains to complete the formation of said compartments.

10. The chain guide rail system described in claim 9, and a duplicate pair of spaced endless chains located directly below said pair of spaced endless chains, and a second bent horizontal extension formed on the lower end of said vertical plate and secured to one of said duplicate pair of endless chains, and a second upside-down chain guide rail system operatively associated with said vertical plates to guide the duplicate pair of endless chains.

* * * * *